No. 653,711. Patented July 17, 1900.
S. P. THRASHER.
CLOCK.
(Application filed Oct. 19, 1896.)
(No Model.) 3 Sheets—Sheet 1.

Witnesses:
Chas. B. Shumway
Geo. C. H. Brown

Inventor
Samuel P. Thrasher

No. 653,711. Patented July 17, 1900.
S. P. THRASHER.
CLOCK.
(Application filed Oct. 19, 1896.)
(No Model.) 3 Sheets—Sheet 2.

Witnesses:
Chas. O. Shumway
Geo. C. Vernon

Inventor
Samuel P. Thrasher

No. 653,711.  S. P. THRASHER.  Patented July 17, 1900.
CLOCK.
(Application filed Oct. 19, 1896.)
(No Model.)  3 Sheets—Sheet 3.
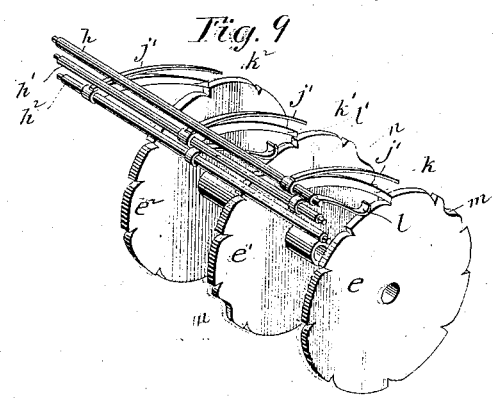
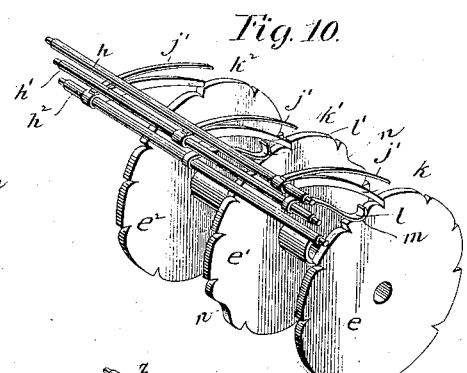
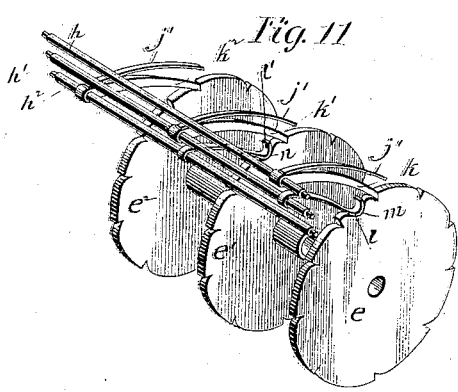
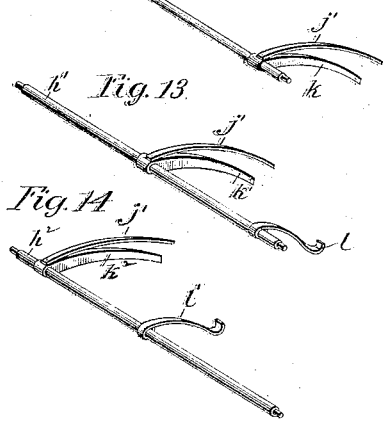
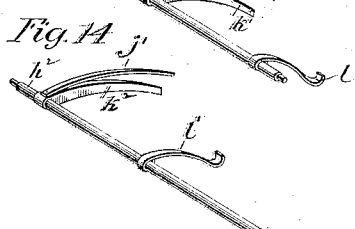
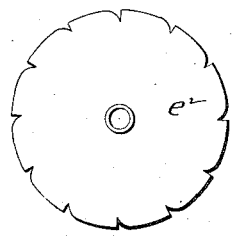
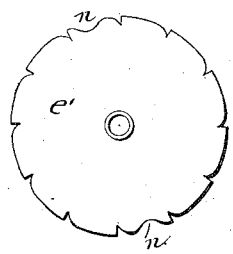
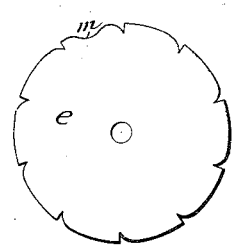
Witnesses:
Chas. O. Shumway
Geo. A. Brown
Inventor
Samuel P. Thrasher

UNITED STATES PATENT OFFICE.

SAMUEL P. THRASHER, OF NEW HAVEN, CONNECTICUT.

CLOCK.

SPECIFICATION forming part of Letters Patent No. 653,711, dated July 17, 1900.

Application filed October 19, 1896. Serial No. 609,293. (No model.)

*To all whom it may concern:*

Be it known that I, SAMUEL P. THRASHER, a citizen of the United States, residing in New Haven, in the county of New Haven and State of Connecticut, have invented certain new and useful Improvements in Time-Indicating Devices; and I do hereby declare the following to be a full, clear, and exact description of the invention, such as will enable others skilled in the art to which it appertains to make and use the same.

My invention relates to time-indicating devices, and is especially adapted to indicate time by figures carried upon rotating spools; and it consists in the construction and relative arrangement of the parts, as hereinafter described, and pointed out in the claims, reference being had to the accompanying drawings, in which like letters of reference indicate like parts throughout the several figures.

Figure 1:
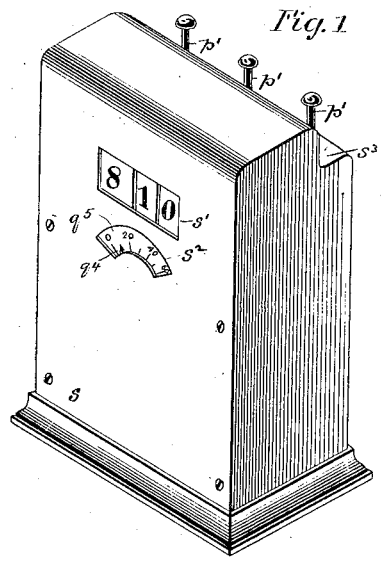
Figure 2:
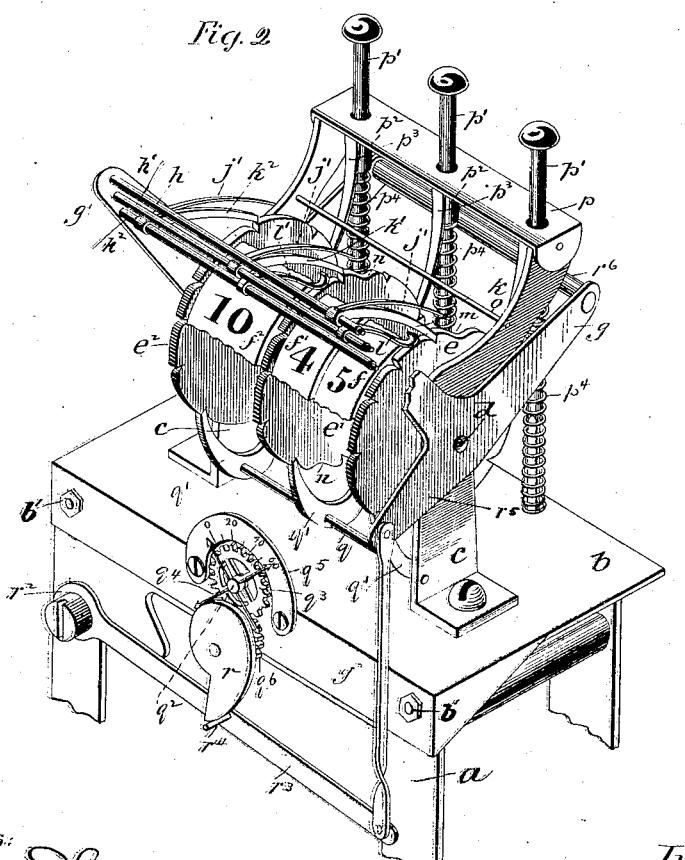
Figure 3:
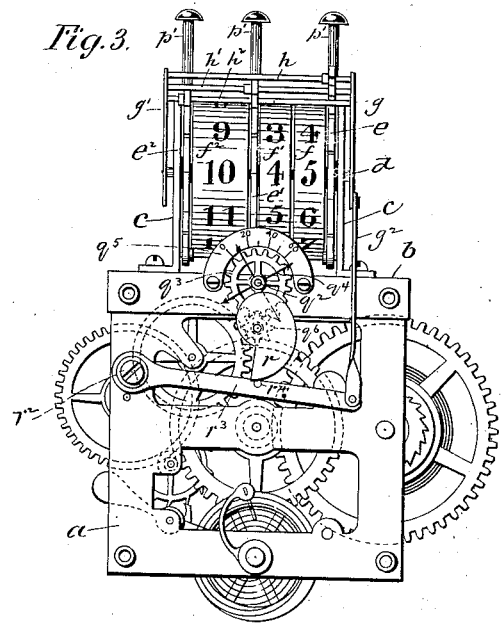
Figure 4:
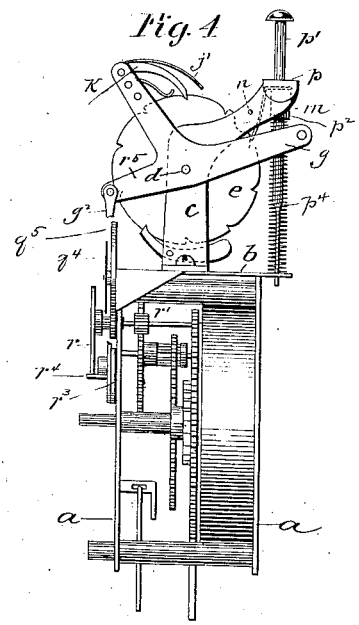
Figure 5:
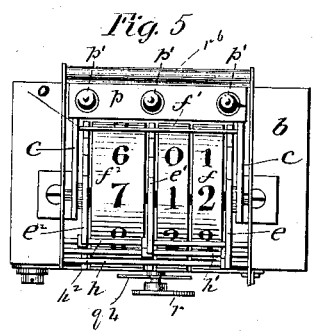
Figure 6:
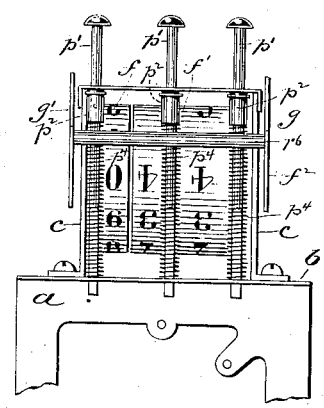
Figure 7:
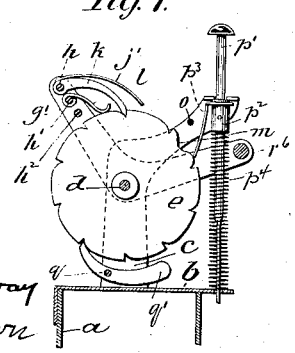
Figure 8:
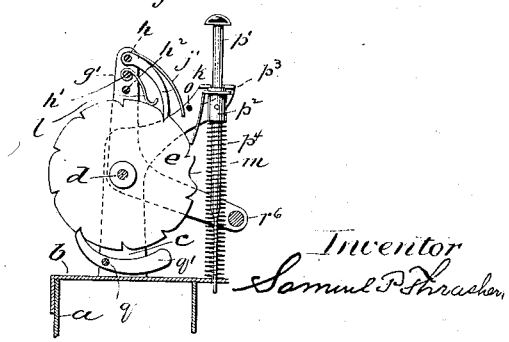

Figure 1 is a perspective view of the case and set-pins extending through the same, also showing perforations in the front for exposing the dials. Fig. 2 is an enlarged perspective view of the time-indicating mechanism. Fig. 3 is a front view of the time-indicating mechanism in connection with a clock-movement. Fig. 4 is a side view of the same. Fig. 5 is a top view. Fig. 6 is a rear view. Fig. 7 is a view, partly in section and partly in elevation, of the outside minute-ratchet, together with its carrying-pawl and spring, also the count-pawl, the same being in position at the starting-point, also showing a set-pin and an idle pawl. Fig. 8 is a view of the parts in Fig. 7, showing their position at the forward limit of motion. Fig. 9 is a perspective view of the several ratchets and pawls, showing only one of the pawls in engagement with the teeth of its ratchet. Fig. 10 is a view of the same parts and showing the count-pawl of the second shaft in engagement with the deep notch of the first ratchet and also the carrying-pawl of the same shaft in engagement with the second ratchet. Fig. 11 is another view of the same parts, showing the count-pawls on the second and third shafts in engagement with the first and second ratchets and all the carrying-pawls in engagement with their respective ratchets. Fig. 12 is a perspective view of shaft $h$ with its carrying-pawl and spring. Fig. 13 is a perspective view of shaft $h'$ with its count-pawl, carrying-pawl, and spring. Fig. 14 is a perspective view of shaft $h^2$ with its count-pawl, carrying-pawl, and spring. Fig. 15 is a side view of the hour-ratchet $e^2$. Fig. 16 is a side view of the ten-minute ratchet $e'$, showing two deep or count notches. Fig. 17 is a side view of the minute-ratchet $e$, showing a single deep or count notch.

In the preferred embodiment of my invention $a$ is the frame of a clock-movement. Arranged above the movement is a time-indicating device, which is secured thereto by means of the forward ends of the pillars of the movement passing through perforations at $b'$ $b'$ in the flange of its base $b$.

$c$ $c$ are standards secured to the base $b$ and supporting a shaft $d$, on which are journaled ratchets $e$ $e'$ $e^2$, preferably carrying time-indicators, in this embodiment spools $f$ $f'$ $f^2$, respectively. The shaft $d$ passes through the standards $c$ $c$ and has pivoted on its outer ends a pawl-carrier $g$, supporting, by means of its upward-extending arms $g'$ $g'$, the shafts $h$ $h'$ $h^2$. Shaft $h$ is provided with pawl $k$ to actuate ratchet $e$. Disposed above the pawl and secured thereto is the spring $j'$, the use of which I will refer to later in my description. Shaft $h'$ is provided with a carrying-pawl $k'$, spring $j'$, and count-pawl $l$, which traverses over the periphery of the ratchet $e$ and is adapted to fall within a deep notch $m$ when the device is in operation. Shaft $h^2$ has a like count-pawl $l'$, which travels in a similar manner over ratchet $e'$, with its deep notches $n$ $n$, and is also provided with the carrying-pawl $k^2$ and spring $j'$, similar to those on shafts $h$ and $h'$. These count-pawls have their lower ends so shaped as to prevent their falling into the notches forming the teeth on the periphery of the ratchets, but are adapted to drop into the deep notches $m$ $n$. The standards $c$ $c$ extend upward beyond the shaft $d$ and substantially to the rear of the ratchets and spools and have their upper ends connected by a bridge $p$, which is perforated and furnishes bearings for the upper ends of the set-pins $p'$ $p'$, the lower ends of the pins extending downward and passing through perforations in base $b$. Secured to the set-pins are the collars $p^2$ $p^2$, which are provided with spring-dogs $p^3$ $p^3$, adapted to engage the teeth of the ratchets when the pins are pushed downward in the operation of setting the device. Said pins are also provided with spiral springs $p^4 p^4$, resting at their lower ends upon base $b$ and their upper ends bearing against the under side of collars $p^3 p^3$. These springs yield upon the downward pressure of the set-pins and serve to return the set-pins to their normal position when released. The lower ends of these set-pins are flattened and have corresponding slots in base $b$ to prevent their turning and to insure the proper position of the spring-dogs in relation to their respective ratchets.

$q' q'$ are idle pawls borne upon shaft $q$, which is made fast in the standards $c\ c$ near the base, the pawls being loose and adapted to engage the teeth of their respective ratchets and prevent undue backward motion during the return movement of the carrying-pawls and in the operation of setting.

I will now speak of the spools and the figures which they carry.

Spool $f$ has upon its face the figures "1, 2, 3, 4, 5, 6, 7, 8, 9, 0," representing the units of minutes and corresponding in number to the ten teeth of the ratchet $e$, to which it is secured in any suitable manner, said spool making a complete revolution once in ten minutes. Spool $f'$ bears upon its face the figures "1, 2, 3, 4, 5, 0," the same being preferably duplicated, whereby the face of the spool is provided with twelve divisions corresponding to the twelve teeth of the ratchet $e'$, to which it is secured, said figures representing the tens of minutes and said spool making a complete revolution once in two hours. The third spool $f^2$, which I designate as the "hour-spool," bears upon its face the numbers "1" to "12," inclusive, and likewise has twelve divisions for the twelve numbers corresponding to the twelve teeth of the ratchet $e^2$, by which it is carried, and revolves once in twelve hours. It is obvious that by duplicating the six figures "1, 2, 3, 4, 5, 0" on the ten-minute spool $f'$ I am able to provide a spool and ratchet corresponding in divisions and teeth to the hour spool and ratchet, thereby producing spools and ratchets of practically the same size, adapting the ratchets to be operated by substantially duplicate mechanism.

I will now describe that part of my time-indicating mechanism which is used to designate the fractions of a minute.

Secured to the flange of the base $b$ is a stud $q^2$, upon which is journaled a gear-wheel $q^3$, bearing upon its hub a seconds-indicator $q^4$, provided, preferably, with four arms, each of which in turn serves as a pointer or hand arranged and adapted to traverse over a seconds-dial $q^5$, secured also to the flange of the base $b$ and arranged in concentric relation with the axis of the seconds-indicator. This gear-wheel is driven by a pinion $q^6$ upon the shaft of the cam $r$ of the clock-movement, which makes a revolution once a minute and is geared with relation to said pinion as one to four, the seconds-indicator thereby making a revolution once in four minutes and causing each of its arms to traverse in turn over the course of the seconds-dial each minute.

I will now speak of the means I employ to rotate the ratchets and spools by the time-train of the clock-movement.

Meshing into and driven by one of the wheels of the time-train is a pinion $r'$, (clearly shown in Fig. 4), borne on a shaft carrying the cam $r$, which is geared to make a revolution once each minute. As a connection between the carrier and the clock-movement I have provided a pivoted lever $r^3$ and pitman $g^2$. The cam $r$ engages a pin $r^4$ on the lever, and as the cam is rotated the lever is thrust downward and released by the cam, carrying the carrier with it. In the present embodiment I have shown the connection between the carrier and clock-movement as a mechanical connection; but obviously the mechanical connection is not absolutely necessary, as a device with a mechanical connection as distinguished from any other means of connection is not necessary. I have already alluded to the yoke $g$ as being pivoted upon the shaft $d$, upon which it is free to turn in either direction. Upon the rear end of the yoke I have arranged a bar $r^6$ of sufficient weight to cause upon the release of the pin $r^4$ at each revolution of the cam the yoke to turn as the weight-bar falls and carry the ratchets and spools by means of the engagement of the pawls the required distance. The cam at each revolution, in conjunction with the pin $r^4$, the lever $r^3$, and pitman $g^2$, serves to turn the yoke backward, lifting the weight-bar and returning the pawl-shafts and pawls to their normal starting-point. By disposing my time-indicating device upon the upper end of a vertically-disposed movement and arranging the cam on the front of the movement, as shown, economy of space is secured and the device is particularly adapted to be inclosed by a clock-case of ordinary proportions.

The carrier $g$ has in this embodiment a shaft $h$ pivoted to it, and this shaft carries a pawl $k$. When the carrier and pawl are moved forward by the weight $r^6$, it is not desirable to suddenly stop the spool. I have therefore provided a checking device, which at the same time operates to press the pawl firmly into the tooth in the ratchet which it engages. To accomplish this result, I have in this embodiment provided a spring $j'$, which I preferably attach to one of the rods on the carrier. $o$, Fig. 2, is a relatively-stationary part—in this embodiment a rod—in the path of movement of $j'$, which rod-device spring slidingly engages to check the movement of the spool and also press the pawl into its detent.

By referring to Fig. 1 it will be seen that the opening through which the seconds-dial shows is curved and that the opening is of the same length as the seconds-scale—that is, in this embodiment a quarter of a circle—although I do not intend to limit myself to this curved scale being a quarter of a circle. It will be seen also that the seconds-hands are spaced apart the length of the scale—that is, in this embodiment ninety degrees—and as the seconds-shaft $q^2$ is rotated these hands will be moved successively over the face of the scale, and as the opening and the scale are each substantially of the same length only one of these hands will move over the scale at the same time and only that one can be seen. Consequently there will be no doubt as to the second indicated.

Having thus described the method in which my device is constructed, I will now proceed to explain the operation of my invention.

It will be perceived that a rotary movement is imparted to the cam $r$, which revolves once a minute, by its shaft and pinion, driven by the time-train of the clock-movement. As has been previously stated, the lever $r^3$ is forced downward by the cam when in operation, and, being connected with the forward end of arm $r^5$ of the yoke $g$ by means of the pitman $g^2$, the arm $r^5$ of the yoke is drawn downward, as shown in Fig. 2, and at the same time the pawls of the shafts $h$, $h'$, and $h^2$, which are supported in the upper ends of arms $g'$ $g'$ of yoke $g$, are drawn backward over the periphery of their respective ratchets to their normal starting-point and carrying-pawl $k$ of shaft $h$ has dropped into engagement with the next succeeding tooth of ratchet $e$, with the count-pawl $l$ of the shaft $h'$ resting upon the periphery of the ratchet $e$ and the carrying-pawl $k'$ of the same shaft held slightly above and out of engagement with the teeth of ratchet $e'$. The shaft $h^2$ has its count-pawl $l'$ also resting on the periphery of the ratchet $e'$ and holding its carrying-pawl $k^2$ likewise above and out of engagement with the teeth of ratchet $e^2$, from which it will be seen that with these parts in this position, as clearly shown in Fig. 9, only the carrying-pawl $k$ of the shaft $h$ is in ratchet engagement. The other relations which these parts assume to each other when the device is in operation will be discussed later on with special reference to the same, as shown in Figs. 10 and 11. It will be further seen that in thus drawing the forward end of the yoke downward in the manner described the weight-bar $r^6$ has been lifted to its highest point. Upon the release of the pin $r^4$ from the point of the cam the weight-bar $r^6$ instantly falls and in its downward motion draws upward the lever $r^3$ until its pin $r^4$ rests at the throat of the cam, and the arms $g'$ $g'$ in their forward movement have carried their shafts $h$, $h'$, and $h^2$ to their extreme forward position, as shown in Fig. 8.

As has been previously stated, with the various parts in the relation to each other just described and shown in Fig. 9, only the ratchet $e$ has been carried by this forward movement of the yoke. Since only the carrying-pawl $k$ was in ratchet engagement and since the count-pawls $l$ $l'$ were adapted in the said forward movement of the yoke to glide over the peripheries of their respective ratchets and hold the pawls secured to their shafts respectively out of engagement with the teeth of the ratchets $e'$ $e^2$ at the forward movement of the yoke, as just described, the operation of carrying forward only the ratchet $e$ one notch at a time is repeated until the deep notch $m$ of the said ratchet is brought under the foot of the count-pawl $l$, into which it falls, and in so doing allows the carrying-pawl $k'$ of its shaft to drop low enough to engage one of the teeth of the ratchet $e'$, as shown in Fig. 10, whereby at the next forward movement of the yoke both the ratchets $e$ and $e'$ will be engaged by their respective pawls and rotated the required distance, and at each successive revolution of the ratchet $e$ the count-pawl $l$ will continue to drop into the deep notch $m$, as shown in Fig. 11, and the said carrying-pawl $k'$ of the shaft $h'$ will continue thereby to intermittently engage at each said revolution a tooth of the ratchet $e'$ until the ratchet $e'$ has been thereby rotated sufficiently to bring under the foot of its count-pawl $l'$ one of the deep notches $n$ of the ratchet $e^2$, as shown in Fig. 11, in which position of the said parts all of the pawls are allowed to drop low enough to engage their respective ratchets and rotate all of the spools and ratchets simultaneously, as clearly shown in Fig. 11, and in like manner at each complete revolution of the ratchet $e$ the ratchet $e'$ continues to be actuated one notch at a time, and at each one-half revolution of said ratchet $e'$ the ratchet $e^2$ continues to be actuated a single tooth until a complete revolution of ratchet $e^2$ has been made, and so on the operation as described is continued *ad infinitum*. It will thus be seen from the foregoing description of these parts how they operate in causing spool $f$ to make a complete revolution once in ten minutes, the spool $f'$ once in two hours, and the spool $f^2$ once in twelve hours, as stated in the earlier part of this description.

As the three set-pins in their construction and operation are substantially alike, I may explain the same by reference to one of them, as shown in Fig. 8. It will be seen that when the set-pin is in its normal position it has the end of its spring-dog slightly above one of the teeth of the ratchet and that to set the same for the next minute or hour, as the case may be, it is only necessary to press the pin downward sufficiently to carry the ratchet forward until the idle pawl shall have fallen into the next succeeding notch, and it is obvious that upon releasing the set-pin from the downward pressure the spiral spring $p^4$ will at once return the same to its normal position. By the yielding pressure of the spring-dog $p^3$ it not only adjusts itself to the ratchet-tooth which it engages when rotating the same, but affords a frictional contact with the periphery of the ratchet in its upward and return motion, whereby it serves in case the ratchet has been moved forward past the proper point to draw the same backward until the idle pawl rests within its notch. In setting the device by this means should the carrying-pawl at any time be in the position shown in Fig. 8 and its spring in close proximity to the under side of check-bar $o$ it will be readily seen that the spring, although forced against the check-bar by means of the forward rotation of the ratchet, will nevertheless yield on account of its elasticity sufficiently to allow the necessary rotation caused by the actuation of the ratchet by the set-pin.

The idle pawls $q'$ $q'$ serve principally to prevent undue backward rotation of the teeth of the ratchets and to secure proper and accurate alinement of the figures on the spools.

It will be observed that in the mechanism shown in the drawings and described herein the fall of the weighted end of the carrier increases the power applied to the drum after the inertia of the same has been overcome and that this weight does not gradually decrease the power applied to the drums as in my application Serial No. 626,012, filed March 5, 1897.

It is evident that various changes in the construction and relative arrangement of the parts herein shown and described might be made and yet be within the spirit and scope of my invention, and I do not wish to be understood as in any way limiting myself to the exact construction and arrangement of the several parts hereinbefore described and set forth; but, Having fully described my invention, what I claim as new, and desire to secure by Letters Patent, is—

1. In a time-indicating device, in combination, a tilting yoke, a movable time-indicator, a ratchet $e'$ connected therewith, count-pawl $l'$, shaft $h^2$, pawl $k^2$, a second movable time-indicator, a ratchet $e^2$ connected therewith, spring $j'$ carried by said yoke and engaging the stationary check-bar $o$, substantially as and for the purposes described.

2. In a time-indicating device, provided with ratchets and spools carrying figures for indicating time, carrying-pawls with springs secured thereto and check-bar $o$ adapted to engage said springs, substantially as and for the purposes described.

3. In a time-indicating device, provided with ratchets for rotating spools carrying figures for indicating the time of day, a check-bar $o$ in combination with springs $j'$ $j'$, of the carrying-pawls, substantially as and for the purposes described.

4. In a time-indicating device in combination a rotating drum carrying time-numerals, a movable ratchet attached to said drum, a pawl engaging said ratchet to move the same to a predetermined position, and a curved spring carried by said pawl and adapted to slidingly engage a relatively-stationary part to check said drum and ratchet in their movement and hold the same in said predetermined position.

5. In a time-indicating device in combination a movable time-indicator, a movable ratchet for actuating the same, a reciprocating pawl-carrier, a pawl carried thereby and engaging said ratchet to move the same to a predetermined position, a relatively-stationary portion, and a spring carried by said reciprocating pawl-carrier and adapted to slidingly engage said stationary portion to gradually check the movement of said pawl-carrier.

6. In a time-indicating device in combination, a movable time-indicator, a movable ratchet for actuating the same, a reciprocating pawl-carrier, a pawl carried thereby and engaging said ratchet to move the same to a predetermined position, a relatively-stationary portion, and a spring carried by said reciprocating pawl-carrier and adapted to slidingly engage said stationary portion to gradually check the movement of said pawl-carrier, said spring being normally out of engagement with said stationary portion.

7. In a time-indicating device in combination, a movable time-indicator, a movable ratchet for actuating the same, a reciprocating pawl-carrier, a pawl carried thereby and engaging said ratchet to move the same to a predetermined position, a weight to move said pawl-carrier, a relatively-stationary portion, and a spring carried by said reciprocating pawl-carrier and adapted to slidingly engage said stationary portion to gradually check the movement of said pawl-carrier.

8. In a time-indicating device in combination, a clock-face having an opening therein, a single stationary and curved seconds-scale showing through and of substantially the same length as that of said opening, a plurality of seconds-hands fixed with relation to each other and spaced apart the length of said scale, said hands being located so as to move behind said face and in front of said scale, and means to move the same successively over said scale.

9. In a time-indicating device in combination, a plurality of drums having time-numerals on the faces thereof, a clock through the face of which the numerals on said drums show successively, a ratchet for each of said drums, a tilting yoke, a pair of rock-rods carried by said yoke, each of the same having a pawl said pawls adapted to engage said ratchets, and a device attached to one of said rods to keep the pawl for the other ratchet out of engagement with the ratchet on said other drum.

10. In a time-indicating device in combination, a plurality of drums having time-numerals on the faces thereof, a clock through the face of which the numerals on said drums show successively, a ratchet fixed to each of said drums, a tilting yoke, a pair of rock-rods carried by said yoke each of the same having a pawl said pawls adapted to engage said ratchets, and a device attached to one of said rods to keep the pawl for the other ratchet out of engagement with the ratchet on said other drum, and a curved spring carried by said yoke adapted to come into contact with the stationary part to check the movement of said yoke.

In testimony whereof I have hereunto set my signature in the presence of two subscribing witnesses.

SAMUEL P. THRASHER.

Witnesses:
  S. E. LEDYARD,
  W. S. TUCKER.